US012697675B2

(12) United States Patent
Park et al.

(10) Patent No.: US 12,697,675 B2
(45) Date of Patent: Aug. 4, 2026

(54) CAP TIP ASSEMBLY FOR SPOT WELDING

(71) Applicant: SUNGWOO HITECH CO., LTD., Busan (KR)

(72) Inventors: Chang-Su Park, Busan (KR); Kwang Hyun Kim, Busan (KR); Kuk Rae Cho, Busan (KR); Sangwoon Nam, Yangsan-si (KR); Ji Hoon Kang, Yangsan-si (KR)

(73) Assignee: SUNGWOO HITECH CO., LTD., Busan (KR)

( * ) Notice: Subject to any disclaimer, the term of this patent is extended or adjusted under 35 U.S.C. 154(b) by 1037 days.

(21) Appl. No.: 17/813,666

(22) Filed: Jul. 20, 2022

(65) Prior Publication Data

US 2023/0123460 A1 Apr. 20, 2023

(30) Foreign Application Priority Data

Oct. 20, 2021 (KR) ........................ 10-2021-0140342

(51) Int. Cl.
| | |
|---|---|
| *B23K 11/11* | (2006.01) |
| *B23K 11/30* | (2006.01) |
| *B23K 35/02* | (2006.01) |
| *B23K 101/00* | (2006.01) |

(52) U.S. Cl.
CPC ......... *B23K 11/115* (2013.01); *B23K 11/3009* (2013.01); *B23K 35/0205* (2013.01); *B23K 2101/006* (2018.08)

(58) Field of Classification Search
CPC .................................................. B23K 11/3009
See application file for complete search history.

(56) References Cited

U.S. PATENT DOCUMENTS

| | | | | |
|---|---|---|---|---|
| 5,006,973 A * | 4/1991 | Turner | .................. | H02M 5/458 |
| | | | | 363/79 |
| 2013/0193117 A1* | 8/2013 | Wada | ..................... | B23K 9/167 |
| | | | | 219/75 |
| 2020/0094345 A1* | 3/2020 | Yang | ..................... | B23K 9/285 |
| 2021/0084722 A1* | 3/2021 | Jung | ..................... | H05B 6/062 |

FOREIGN PATENT DOCUMENTS

| | | | |
|---|---|---|---|
| DE | 212007000009 | 4/2008 | |
| DE | 212007000009 U1 * | 4/2008 | ........... B23K 11/115 |
| DE | 10 2009 019 237 | 11/2009 | |
| DE | 102009019237 A1 * | 11/2009 | ......... B23K 11/3009 |

(Continued)

OTHER PUBLICATIONS

DE_212007000009_U1_Translation (Year: 2007).*

(Continued)

*Primary Examiner* — Woody A Lee, Jr.
(74) *Attorney, Agent, or Firm* — LEX IP MEISTER, PLLC

(57) ABSTRACT

A cap tip assembly for spot welding is disclosed. The cap tip assembly for spot welding is configured to spot-weld a first base material in which a flange is formed and a second base material overlapping the flange in a vertical direction. The cap tip assembly for spot welding includes a tip body provided in a shape of a rectangular block in which a round-shaped welding section is formed on a front side of a top surface, and a collet member coupled to the tip body to guide a conductive tape to the welding section.

16 Claims, 14 Drawing Sheets

100

(56)                    References Cited

FOREIGN PATENT DOCUMENTS

| | | | | | |
|----|----|----|----|----|----|
| DE | 102015207518 | A1 | * | 11/2016 | ........... B23K 35/222 |
| JP | H0649427 | Y2 | * | 12/1994 | |
| JP | 2527731 | B2 | * | 8/1996 | ............. B23K 9/201 |
| JP | H10-263841 | | | 10/1998 | |
| JP | 2007080752 | A | * | 3/2007 | ............. H05B 6/062 |
| KR | 10-2014-0079950 | | | 6/2014 | |
| KR | 10-2015-0055139 | | | 5/2015 | |
| KR | 10-2015-0062042 | | | 6/2015 | |
| KR | 10-2015-0076566 | | | 7/2015 | |
| KR | 10-2020-0073390 | | | 6/2020 | |
| WO | WO-2012176724 | A1 | * | 12/2012 | ......... B23K 35/0294 |
| WO | 2015-133096 | | | 9/2015 | |

OTHER PUBLICATIONS

DE 102009019237 Translation (Year: 2009).*
EPO, extended European search report of application No. 22191281.9 dated Feb. 15, 2023.
EPO, Office Action of EP 22191281.9 dated Oct. 9, 2024, total 6 pages.

* cited by examiner (a)                  (b)

(a)                            (b)

70

(a)

(b)

CAP TIP ASSEMBLY FOR SPOT WELDING

CROSS-REFERENCE TO RELATED APPLICATION

This application claims priority to and the benefit of Korean Patent Application No. 10-2021-0140342 filed in the Korean Intellectual Property Office on Oct. 20, 2021, the entire contents of which are incorporated herein by reference.

BACKGROUND OF THE INVENTION

(a) Field of the Invention

The present invention relates to a spot welding apparatus. More particularly, the present invention relates to a cap tip assembly for spot welding configured to spot-weld a plurality of vehicle body parts in a vehicle body assembly process.

(b) Description of the Related Art

In general, in a vehicle body assembly process, a spot welding apparatus is used for assembling a plurality of vehicle body parts such as a vehicle body panel. The spot welding apparatus basically includes a gun body, and a fixed electrode and a movable electrode which are welding electrodes installed on the gun body.

Each of the fixed electrode and the movable electrode has a cap tip as a welding electrode tip fixed to an electrode rod. The cap tip is manufactured in various shapes according to the shape, material, and welding conditions of an object to be welded (hereinafter, also referred to as a "welding object").

Recently, a spot welding apparatus for supplying a conductive tape to the cap tip or recovering the conductive tape from the cap tip has been developed in order to prevent a welding fusion product from adhering to the cap tip.

The cap tip applied to the spot welding apparatus forms an electrode surface (commonly referred to as an 'electrode contacting surface' by those skilled in the art) for pressurization and conduction of the object to be welded. In one example, the electrode surface of a general cap tip may be formed as a circular flat surface, and in another example, it may be formed as a quadrangle flat surface.

In addition, a spot welding apparatus may spot-weld vehicle body parts having various shapes, for example, a flange formed on one vehicle body part to another vehicle body part. The electrode surface of the cap tip applied to the spot welding apparatus is one of factors for determining the width of the flange.

Accordingly, in order to reduce the weight of the vehicle body by reducing the width of the flange of the vehicle body part, the size of the electrode surface of the cap tip should be reduced. For this purpose, it is necessary to study the shape of the cap tip capable of minimizing a contact area of the electrode surface in contact with the welding object.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a cap tip assembly for spot welding having advantages of capable of spot welding of a flange with a relatively short width length while maintaining spot welding performance by reducing an electrode contact area with respect to a welding object.

An exemplary embodiment of the present invention provides a cap tip assembly for spot welding mounted on at least one of electrode rods of a fixed electrode and a movable electrode of a spot welding apparatus and configured to spot-weld a first base material in which a flange is formed and a second base material overlapping the flange in a vertical direction. The cap tip assembly for spot welding may include a tip body provided in a shape of a rectangular block in which a round-shaped welding section is formed on a front side of a top surface.

In addition, in the cap tip assembly for spot welding according to an exemplary embodiment, the tip body may include a non-welding section extending in a front-rear direction from the welding section to a rear side of the top surface.

In addition, in the cap tip assembly for spot welding according to an exemplary embodiment of the present invention, the welding section may include a base metal contact surface of a predetermined curvature, and a virtual welding start line formed in a direction normal to the base material contact surface.

In addition, in the cap tip assembly for spot welding according to an exemplary embodiment of the present invention, the base material contact surface may include melt diffusion sections formed on both front and rear portions based on the virtual welding start line.

In addition, in the cap tip assembly for spot welding according to an exemplary embodiment of the present invention, the non-welded section may include a base material non-contact surface having a greater curvature than that of the base material contact surface.

In addition, in the cap tip assembly for spot welding according to an exemplary embodiment of the present invention, the tip body may include round sections extending from the base material contact surface and the base material non-contact surface to both sides, respectively.

In addition, in the cap tip assembly for spot welding according to an exemplary embodiment of the present invention, a radius of the base material contact surface may be greater than a radius of the base material non-contact surface.

Further, another embodiment of the present invention provides a cap tip assembly for spot welding configured to spot-weld a first base material in which a flange is formed and a second base material overlapping the flange in a vertical direction. The cap tip assembly for spot welding may include a tip body provided in a shape of a rectangular block in which a round-shaped welding section is formed on a front side of a top surface, and a collet member coupled to the tip body to guide a conductive tape to the welding section.

In addition, in the cap tip assembly for spot welding according to an exemplary embodiment of the present invention, the tip body may include a non-welding section extending along a front-rear direction from the welding section to the rear side of the top surface with a greater curvature than a curvature of the welding section.

In addition, in the cap tip assembly for spot welding according to an exemplary embodiment of the present invention, the welding section may include a base metal contact surface of a predetermined curvature, and a virtual welding start line formed in a direction normal to the base material contact surface.

In addition, in the cap tip assembly for spot welding according to an exemplary embodiment of the present invention, the non-welding section may include a base material non-contact surface having a greater curvature than that of the base material contact surface.

In addition, in the cap tip assembly for spot welding according to an exemplary embodiment of the present invention, the collet member may include a rectangular collet body including both side walls corresponding to both sides of the tip body, respectively, and opened in the front-rear direction and the vertical direction, a first tape transport track integrally connected to front upper parts of the both sidewalls to correspond to the welding section, and a second tape transport track integrally connected to rear upper parts of the both sidewalls to correspond to the non-welding section.

In addition, in the cap tip assembly for spot welding according to an exemplary embodiment of the present invention, the collet member may include first chamfered portions formed at the front upper parts of the both sidewalls to be lower than the uppermost end of the first tape transport track, and second chamfered portions formed at the rear upper parts of the both sidewalls to be lower than the uppermost end of the second tape transport track.

In addition, in the cap tip assembly for spot welding according to an exemplary embodiment of the present invention, the first tape transport track may include a first support surface for supporting a front surface of the tip body, and a first track surface having a round shape for supporting the conductive tape.

In addition, in the cap tip assembly for spot welding according to an exemplary embodiment of the present invention, the second tape transport track may include a second support surface for supporting a rear surface of the tip body, and a second track surface having a round shape for supporting the conductive tape.

In addition, in the cap tip assembly for spot welding according to an exemplary embodiment of the present invention, each of the first chamfered portion and the second chamfered portion may include a guide surface supporting each of both edge ends of the conductive tape transported along the first track surface and the second track surface.

In addition, in the cap tip assembly for spot welding according to an exemplary embodiment of the present invention, the first chamfered portion may include a first chamfered surface formed at a position lower than the uppermost end of the first tape transport track, and a second chamfered surface obliquely extending from the first chamfered surface to the both sidewalls.

In addition, in the cap tip assembly for spot welding according to an exemplary embodiment of the present invention, the second chamfered portion may include a third chamfered surface formed at a position lower than the uppermost end of the second tape transport track, and a fourth chamfered surface obliquely extending from the third chamfered surface to the both sidewalls.

In addition, in the cap tip assembly for spot welding according to an exemplary embodiment of the present invention, the tip body may include a first support step formed in an upper portion of a front surface to support the first tape transport track, and a second support step formed in an upper portion of a rear surface to support the second tape transport track.

In addition, in the cap tip assembly for spot welding according to an exemplary embodiment of the present invention, the collet body may include positioning protrusions formed on the both sidewalls, respectively.

Also, in the cap tip assembly for spot welding according to an exemplary embodiment of the present invention, grooves engageable with the positioning protrusions may be formed in the tip body.

In addition, in the cap tip assembly for spot welding according to an exemplary embodiment of the present invention, the collet member may include triangular rib-shaped reference protrusions integrally formed on upper ends of both sidewalls of the collet body.

According to exemplary embodiments of the present invention, since a vehicle body part having a flange with a relatively small width length may be spot welded to another vehicle body part, it is possible to reduce the weight of the vehicle body.

In addition, effects obtainable or predicted by an exemplary embodiment of the present invention are to be disclosed directly or implicitly in the detailed description of an exemplary embodiment of the present invention. In other words, various effects predicted according to an exemplary embodiment of the present invention will be disclosed in the detailed description to be described later.

BRIEF DESCRIPTION OF THE DRAWINGS

Since these drawings are for reference in describing exemplary embodiments of the present invention, the technical spirit of the present invention should not be construed as being limited to the accompanying drawings.

It is to be understood that the drawings referenced above are not necessarily drawn to scale, but rather present rather simplified representations of various preferred features illustrating the basic principles of the present invention. Specific design features of the present invention, including, for example, a particular dimension, direction, position, and shape, will be determined in part by a particular intended application and an environment of use.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular exemplary embodiments only, and is not intended to limit the present disclosure. As used herein, the singular forms are intended to include the plural forms as well, unless the context clearly indicates otherwise.

It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. As used herein, the term "and/or" includes any one and any combination of any two or more of the associated listed items. In this specification, the term "connected" or "coupled" indicates a physical relationship between two components in which the components are directly connected to each other or indirectly connected through one or more intermediary components.

As used herein, the terms "vehicle", "of the vehicle", and "automobile", or other similar terms generally include passenger automobiles including passenger vehicles, sport utility vehicles (SUVs), buses, trucks, and various commercial vehicles, and include hybrid vehicles, electric vehicles, hybrid electric vehicles, electric vehicle-based Purpose Built Vehicle (PBV) vehicles, hydrogen powered vehicles, and other alternative fuel vehicles (e.g., fuel derived from resources other than petroleum).

Hereinafter, exemplary embodiments of the present invention will be described in detail with reference to the accompanying drawings.

Figure 1:
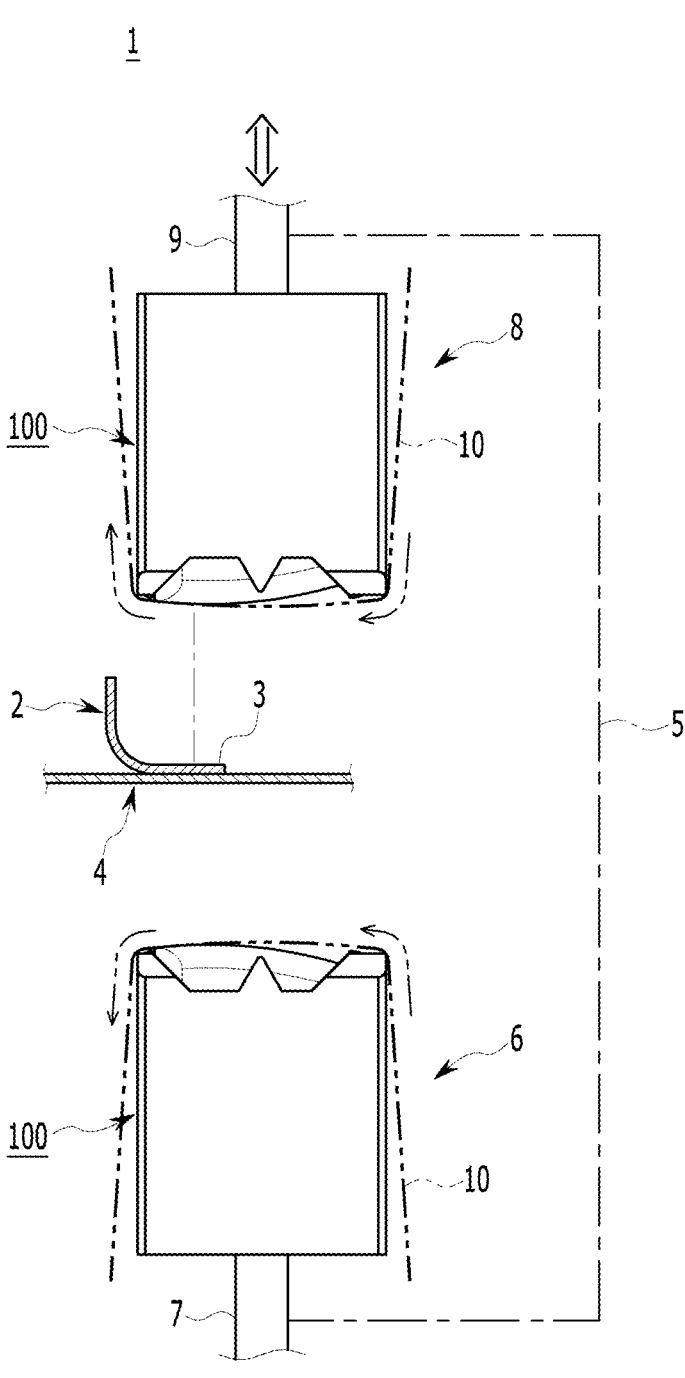
FIG. 1 is a diagram schematically illustrating a spot welding apparatus to which a cap tip assembly for spot welding according to an exemplary embodiment of the present invention is applied.

FIG. 1 is a diagram schematically illustrating a spot welding apparatus to which a cap tip assembly for spot welding according to an exemplary embodiment of the present invention is applied.

Referring to FIG. 1, a cap tip assembly 100 for spot welding according to an exemplary embodiment of the present invention may be applied to a spot welding apparatus 1 for spot welding a plurality of vehicle body parts such as a vehicle body panel in a vehicle body assembly line.

In one example, the spot welding apparatus 1 may spot-weld a first base material 2 and a second base material 4 overlapping each other among a plurality of vehicle body parts.

Here, the first base material 2 and the second base material 4 may include, for example, a steel sheet such as a steel plate, a stainless steel plate, a high-tensile steel plate, and an ultra-high-tensile steel plate.

Furthermore, the first base material 2 includes a flange 3 bent to a predetermined width. This flange 3 overlaps the second base material 4 and may be joined to the second base material 4 by spot welding through the spot welding apparatus 1.

Here, the first base material 2 and the second base material 4 are not limited to including a steel sheet for a vehicle body panel, and may include a vehicle body structure such as a member and frame for a vehicle body.

In addition, it should not be understood that the scope of the present invention is limited to joining a plurality of vehicle body parts by spot welding, and the technical idea of the present invention may be applied as long as steel sheet parts employed in structures of various types and uses are joined by spot welding.

Hereinafter, an example of spot welding the flange 3 and the second base material 4 in a state where the lower surface of the flange 3 of the first base material 2 overlaps an upper surface of the second base material 4 in a vertical direction is described.

Furthermore, in the following, as shown in the drawing, an example of spot welding the first base material 2 and the second base material 4 through the spot welding apparatus 1 on the basis of when the spot welding apparatus 1 is erected in the vertical direction will be described.

However, the definition of the direction as described above is a relative meaning, and since the definition of the direction may vary depending on a reference position of the first base material 2, the second base material 4 and a welding direction of the spot welding apparatus 1, an the like, the direction is not necessarily limited to the reference direction of the present embodiment.

In the present specification, an 'upper end part', 'upper part', 'upper end', or 'upper surface' of a constituent element indicates an end part, part, end, or surface of the constituent element that is relatively upper in the drawing, and a 'lower end part', 'lower part', 'lower end', or 'lower surface' of a constituent element indicates an end part, part, end, or surface of the constituent element that is relatively lower in the drawing.

In addition, in the present specification, an end of a constituent element (e.g., one end or the other end) indicates the end of the constituent element in any one direction, and an end part of a constituent element (e.g., one end part or the other end part) indicates a certain part of the constituent element including its end.

In addition, the spot welding apparatus 1 applied to an exemplary embodiment of the present invention basically includes a gun frame 5, and a fixed electrode 6 and a movable electrode 8 installed on the gun frame 5.

The gun frame 5 is provided as a base frame for installing various constituent elements to be described below, and in one example, may be provided as a 'C'-shaped welding gun. Furthermore, the gun frame 5 may be mounted on the tip of an articulated arm of a welding robot (not shown in the drawing).

The fixed electrode 6 and the movable electrode 8 press the flange 3 of the first base material 2 and the second base material 4 against each other, and are configured to spot-weld the flange 3 and the second base material 4 by applying a welding current to the flange 3 and the second base material 4.

However, the present invention is not limited to being applied to a bidirectional spot welding apparatus 1 that implements spot welding in both directions through the fixed electrode 6 and the movable electrode 8, and may also be applied to a one-way spot welding apparatus that performs spot welding in one direction through the fixed electrode 6 and the movable electrode 8.

However, an exemplary embodiment of the present invention describes an example of spot welding the flange 3 of the first base material 2 and the second base material 4 using the fixed electrode 6 and the movable electrode 8 in both directions.

The fixed electrode 6 may be installed at one end part (a bottom part in reference to the drawing) of the gun frame 5. The fixed electrode 6 is configured to support a lower surface of the second base material 4, and apply a welding current to the second base material 4.

Further, the movable electrode 8 may be installed to move forward and backward in the vertical direction at the other end part (a top part in reference to the drawing) of the gun frame 5 in correspondence to the fixed electrode 6.

The movable electrode 8 is configured to press the flange 3 of the first base material 2 from the upper side to the lower side, and apply a welding current to the flange 3. Here, the movable electrode 8 may be moved in the vertical direction by a driving source (not shown in the drawing) such as a servo motor or an operation cylinder well known to a person of an ordinary skill in the art.

Each of the fixed electrode 6 and the movable electrode 8 includes the cap tip assembly 100 according to an exemplary embodiment of the present invention. The cap tip assembly 100 according to an exemplary embodiment of the present invention is mounted on electrode rods 7 and 9 of the fixed electrode 6 and the movable electrode 8, respectively.

Here, the cap tip assembly 100 according to an exemplary embodiment of the present invention may be mounted on an upper end part of the electrode rod 7 provided in the fixed electrode 6, and may be mounted on a lower end part of the electrode rod 9 provided in the movable electrode 8.

Hereinafter, constituent elements of the cap tip assembly 100 mounted on the upper end part of the electrode rod 7 provided in the fixed electrode 6 will be exemplarily described with the vertical direction in the drawing as a reference direction.

Furthermore, the cap tip assembly 100 according to an exemplary embodiment of the present invention may be applied to the spot welding apparatus 1 of a type that supplies and recovers an conductible band-shaped copper tape (hereinafter, referred to as 'conductive tape 10' for convenience).

The conductive tape 10 is supplied to the cap tip assembly 100 along a predetermined path, and is configured to prevent a fusion product generated during spot welding from adhering to the cap tip assembly 100.

The cap tip assembly 100 for spot welding according to an exemplary embodiment of the present invention has a structure capable of spot welding the flange 3 with a relatively short width length while maintaining spot welding performance as it is by reducing an electrode contact area for the flange 3 of the first base material 2 and the second base material 4. Such spot welding of the flange 3 with the relatively short width length is commonly referred to as 'shot flange spot welding' by those skilled in the art.

Figure 2:
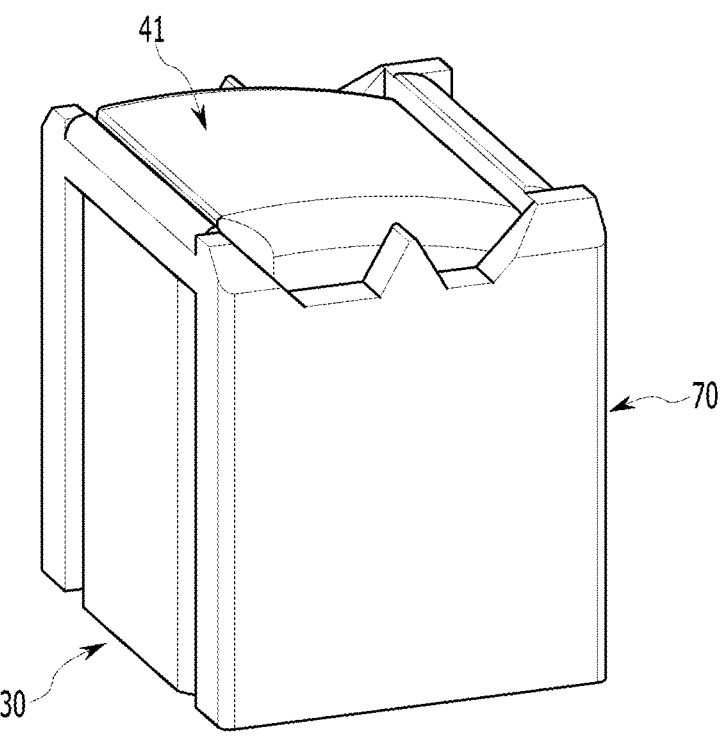
FIG. 2 is a combined perspective view illustrating a cap tip assembly for spot welding according to an exemplary embodiment of the present invention.
Figure 3:
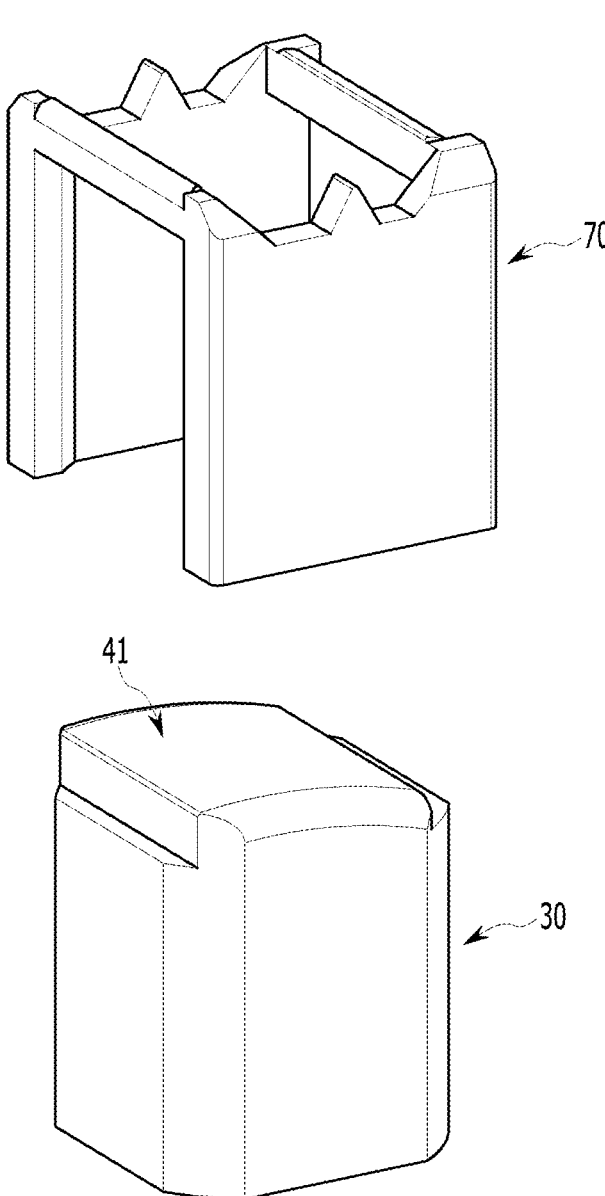
FIG. 3 is an exploded perspective view illustrating a cap tip assembly for spot welding according to an exemplary embodiment of the present invention.
Figure 4:
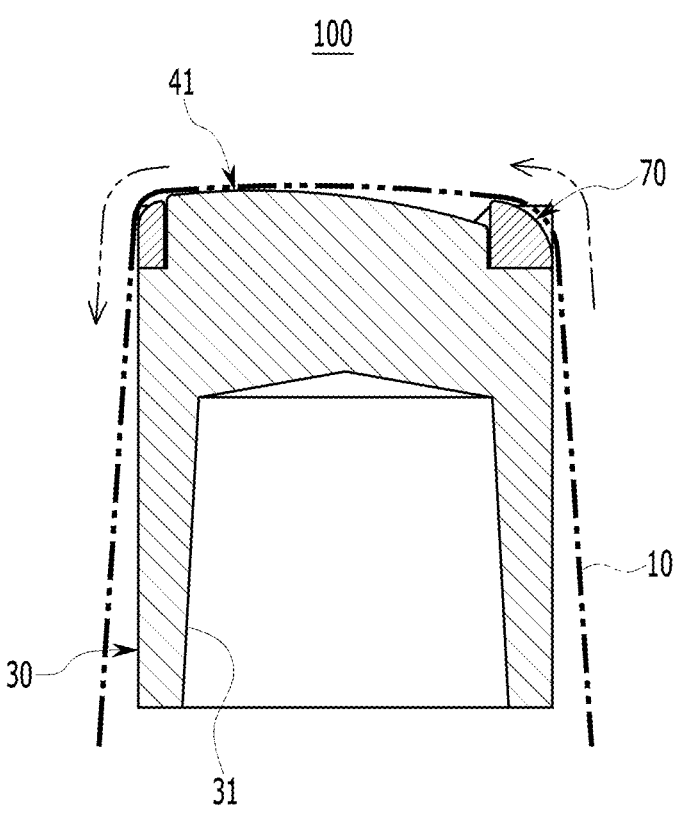
FIG. 4 is a combined cross-sectional view illustrating a cap tip assembly for spot welding according to an exemplary embodiment of the present invention.

FIG. 2 is a combined perspective view illustrating a cap tip assembly for spot welding according to an exemplary embodiment of the present invention, FIG. 3 is an exploded perspective view illustrating a cap tip assembly for spot welding according to an exemplary embodiment of the present invention, and FIG. 4 is a combined cross-sectional view illustrating a cap tip assembly for spot welding according to an exemplary embodiment of the present invention.

Referring to FIGS. 1 to 4, the cap tip assembly 100 for spot welding according to an exemplary embodiment of the present invention basically includes a tip body 30 and a collet member 70.

In an exemplary embodiment of the present invention, the tip body 30 is provided as a welding electrode tip of the spot welding apparatus 1. The tip body 30 is mounted on each of the electrode rods 7 and 9 of the fixed electrode 6 and the movable electrode 8 of the spot welding apparatus 1, respectively.

In one example, the tip body 30 is provided in the form of a rectangular block made of a copper material. The tip body 30 includes a coupling groove 31 capable of being coupled to each of the electrode rods 7 and 9.

Figure 5:
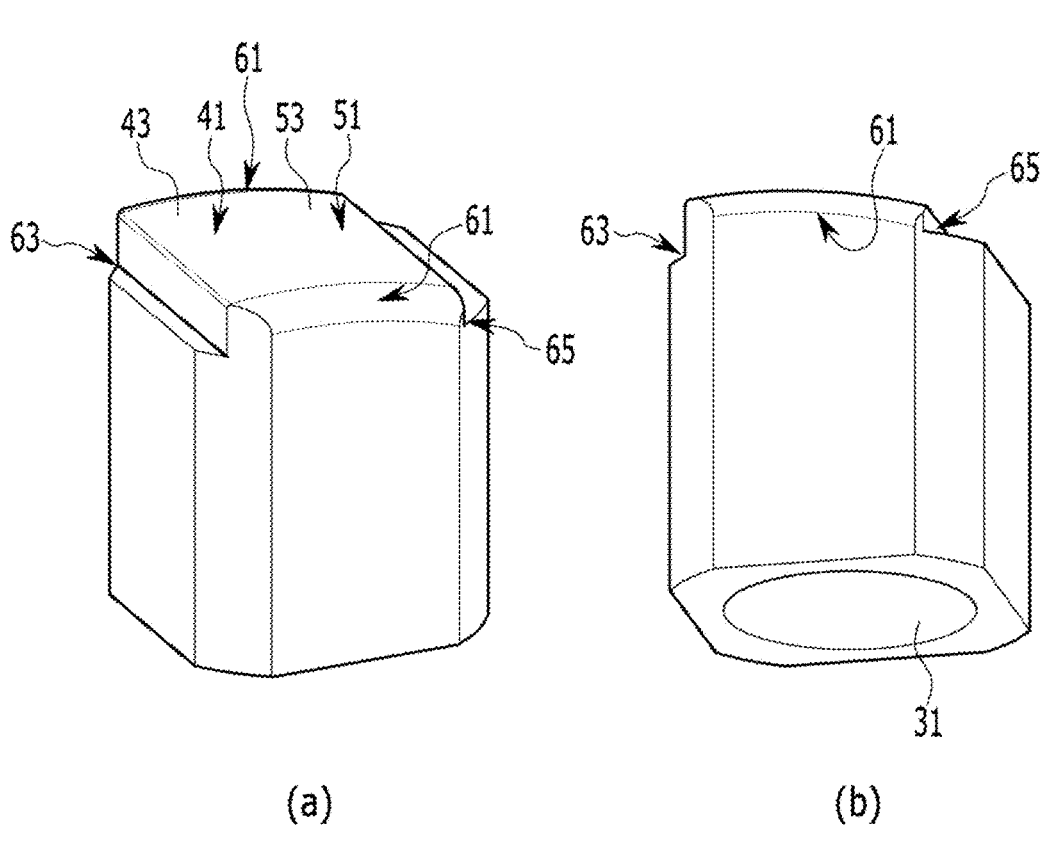
FIGS. 5 and 6 are perspective views illustrating a tip body applied to a cap tip assembly for spot welding according to an exemplary embodiment of the present invention.
Figure 6:
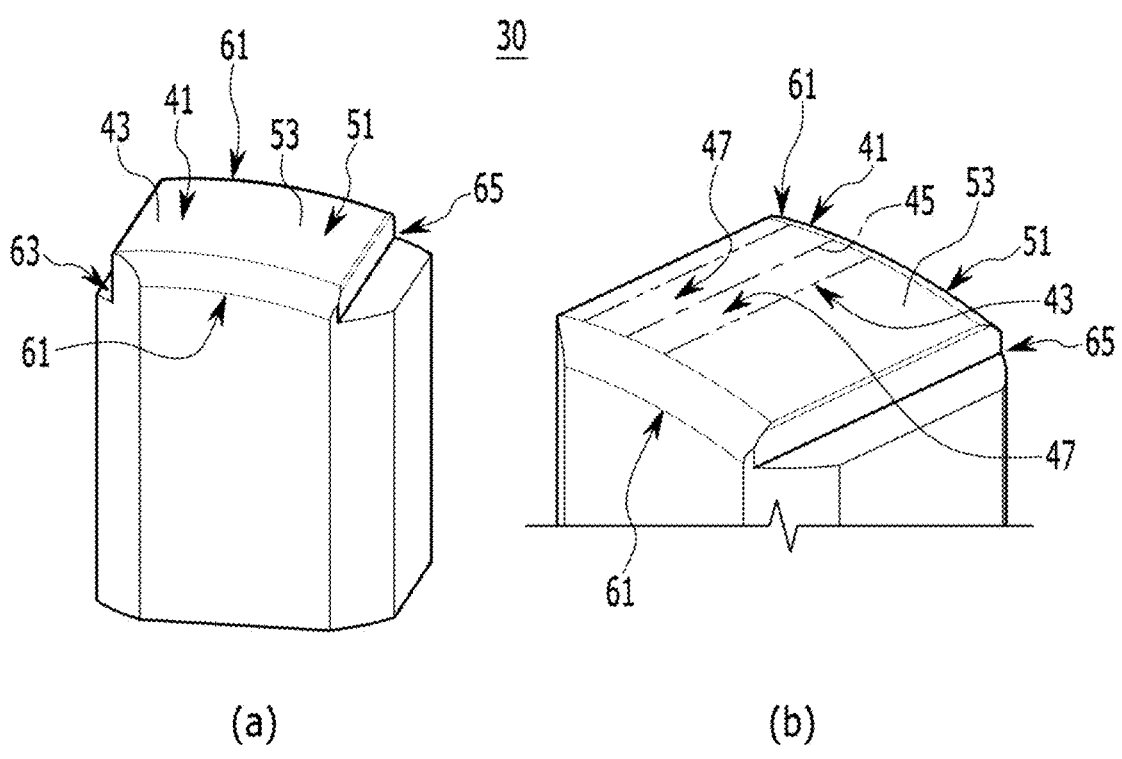
Figure 7:
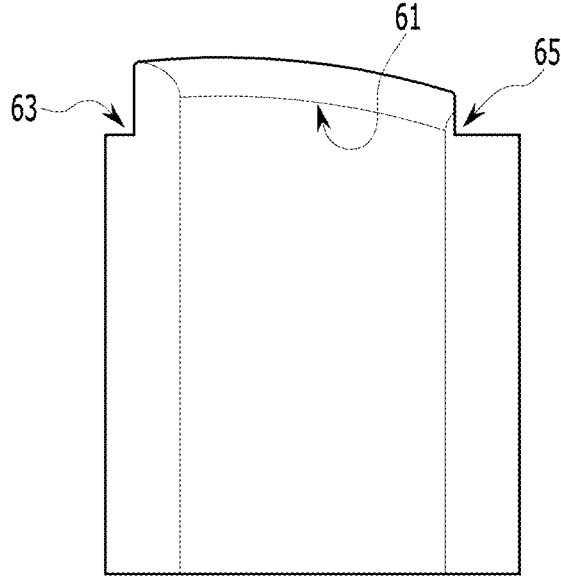
FIG. 7 is a side view illustrating a tip body applied to a cap tip assembly for spot welding according to an exemplary embodiment of the present invention.
Figure 8:
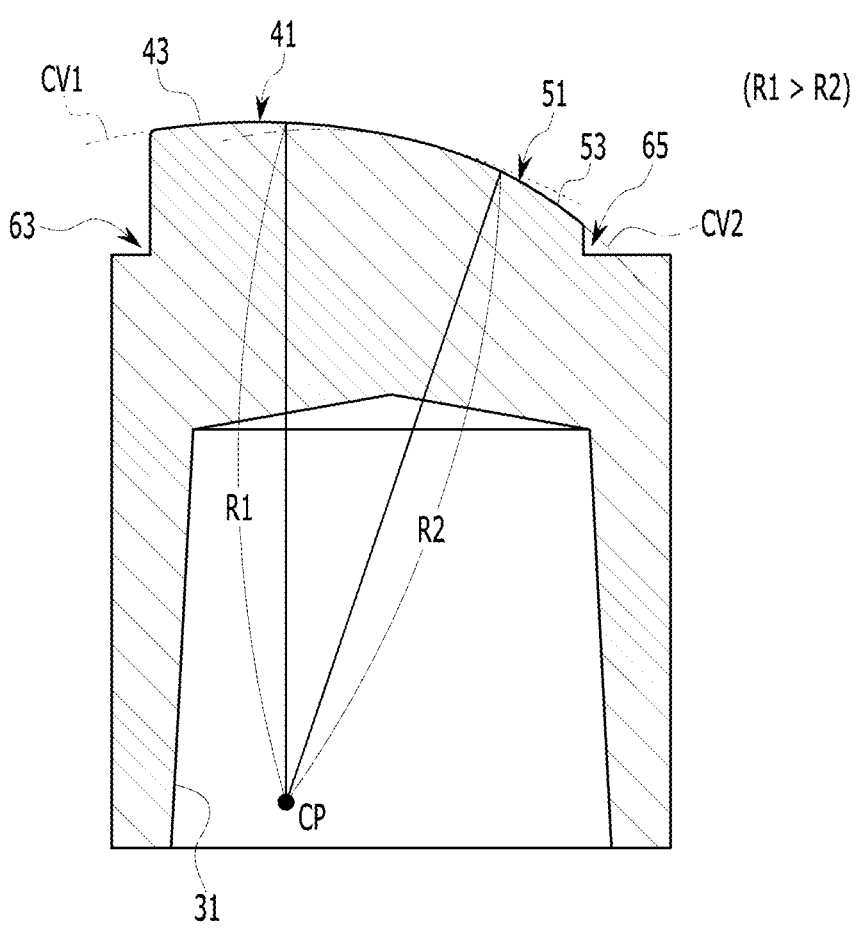
FIG. 8 is a side cross-sectional view illustrating a tip body applied to a cap tip assembly for spot welding according to an exemplary embodiment of the present invention.

FIGS. 5 and 6 are perspective views illustrating a tip body applied to a cap tip assembly for spot welding according to an exemplary embodiment of the present invention, FIG. 7 is a side view illustrating a tip body applied to a cap tip assembly for spot welding according to an exemplary embodiment of the present invention, and FIG. 8 is a side cross-sectional view illustrating a tip body applied to a cap tip assembly for spot welding according to an exemplary embodiment of the present invention.

Referring to FIGS. 2 to 8, the tip body 30 according to an exemplary embodiment of the present invention basically includes a welding section 41, a non-welding section 51, and a round section 61.

The welding section 41 is a portion for performing substantial spot welding of the flange 3 of the first base material 2 and the second base material 4. The welding section 41 is configured to substantially contact the flange 3 and the second base material 4.

The welding section 41 is formed in a round shape on one side of the top surface with respect to both sides of the tip body 30. The welding section 41 is formed to be convex upward from the one side of the top surface of the tip body 30 in the drawing. Here, the one side may be defined as the front side of the tip body 30 in the drawing.

The welding section 41 includes a base material contact surface 43 and a virtual welding start line 45. The base material contact surface 43 is formed with a predetermined curvature CV1 on the one side of the top surface of the tip body 30.

The virtual welding start line 45 may be defined as a line where spot welding of the flange 3 of the first base material 2 and the second base material 4 starts. The virtual welding start line 45 is formed along a direction of a normal line to the base material contact surface 43 (a lateral direction). Here, the normal line may be defined as a straight line perpendicular to a tangent line passing through a point on a curve on the base material contact surface 43 of the predetermined curvature CV1.

Furthermore, in the above, the base material contact surface 43 includes melt diffusion sections 47 that are partitioned on both front and rear sides based on the virtual welding start line 45, respectively.

The melt diffusion sections 47 may be defined as sections in which, when spot welding the flange 3 of the first base material 2 and the second base material 4, melt of the flange 3 and the second base material 4 is diffused along the front-rear direction around the virtual welding start line 45.

Here, the base material contact surface 43 of the welding section 41 may form a rectangular welding nugget by the melt diffusion section 47 during spot welding of the flange 3 of the first base material 2 and the second base material 4.

The non-welding section 51 is a portion in which substantial spot welding of the flange 3 of the first base material 2 and the second base material 4 is not performed. The non-welding section 51 is not substantially in contact with the flange 3 and the second base material 4.

The non-welding section 51 extends along the front-rear direction from the base metal contact surface 43 of the weld section 41 to the other side of the top surface with respect to both sides of the tip body 30. Here, the other side may be defined as the rear side of the tip body 30 in the drawing.

The non-welding section 51 includes a base metal non-contact surface 53 that extends from the base metal contact surface 43 of the welding section 41 to the rear side. The base material non-contact surface 53 is formed with a curvature CV2 greater than the curvature CV1 of the base material contact surface 43.

In detail, as shown in FIG. 8, a radius R1 of the base material contact surface 43 of the welding section 41 is greater than a radius R2 of the base material non-contact surface 53 of the non-welding section 51 with respect to a radius center point CP. Accordingly, the base material non-contact surface 53 may be formed to have the curvature CV2 greater than the curvature CV1 of the base material contact surface 43.

The round section 61 is designed to minimize indentation and to promote the beauty of the shape of the welding nugget during spot welding of the flange 3 of the first base material 2 and the second base material 4. The round section 61 extends from the base material contact surface 43 of the welding section 41 and the base material non-contact surface 53 of the non-welding section 51 to both sides of the tip body 30, respectively.

Referring to FIGS. 1 to 4, in an exemplary embodiment of the present invention, the collet member 70 is configured to guide the conductive tape 10 to the welding section 41 of the tip body 30.

Furthermore, the collet member 70 is configured to guide the conductive tape 10 traveling along a predetermined tape supply path and tape recovery path in the spot welding apparatus 1.

The collet member 70 is coupled to the tip body 30. In one example, the collet member 70 is formed of a steel material.

Figure 9:
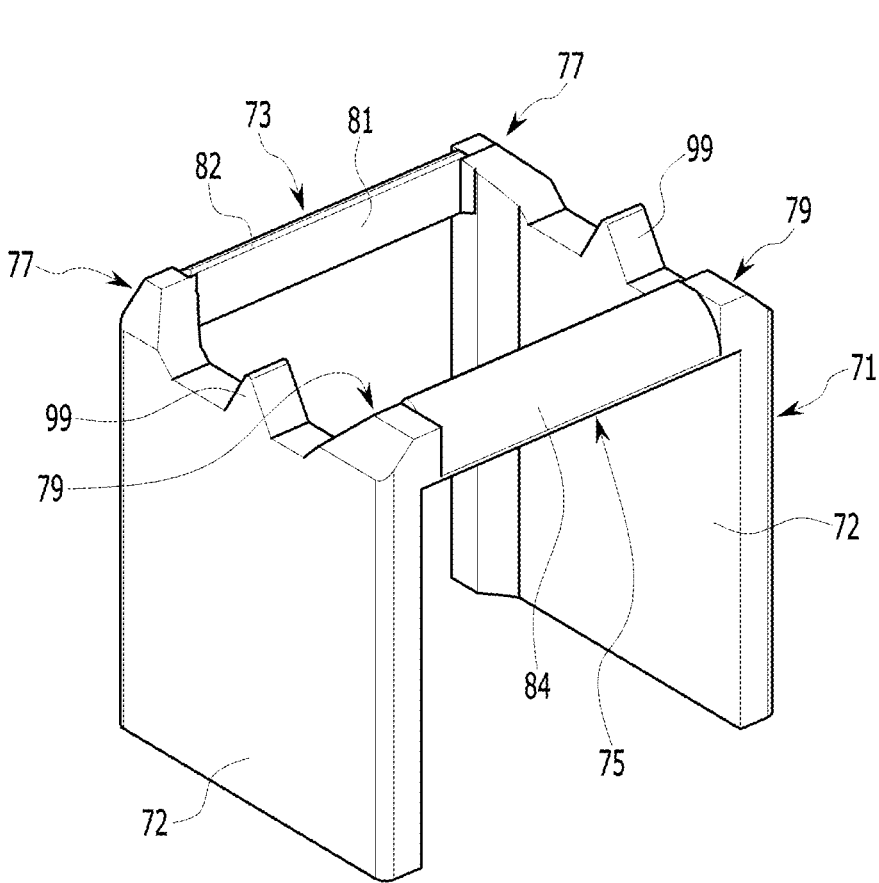
FIGS. 9 and 10 are perspective views illustrating a collet member applied to a cap tip assembly for spot welding according to an exemplary embodiment of the present invention.
Figure 10:
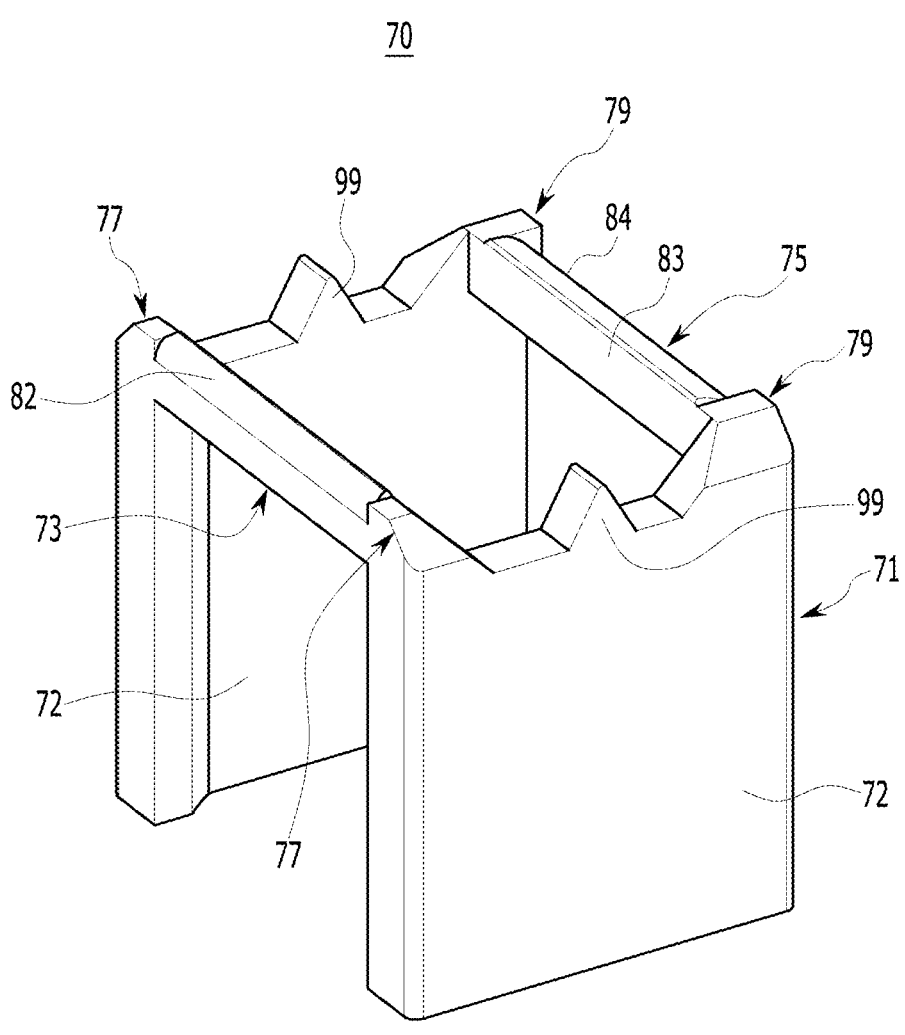
Figure 11:
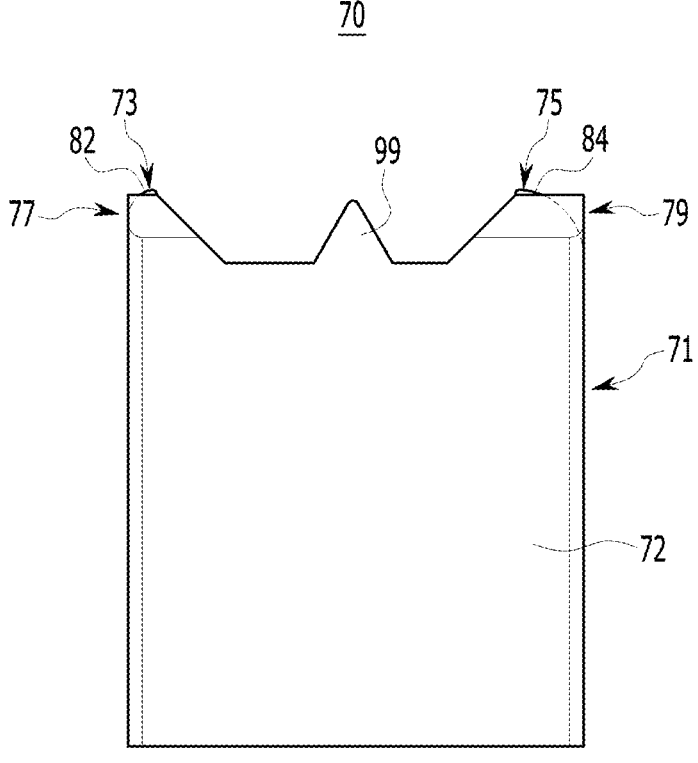
FIG. 11 is a side view illustrating a collet member applied to a cap tip assembly for spot welding according to an exemplary embodiment of the present invention.

FIGS. 9 and 10 are perspective views illustrating a collet member applied to a cap tip assembly for spot welding according to an exemplary embodiment of the present invention. FIG. 11 is a side view illustrating a collet member applied to a cap tip assembly for spot welding according to an exemplary embodiment of the present invention.

Referring to FIGS. 9 to 11 together with FIGS. 1 to 8, the collet member 70 according to an exemplary embodiment of the present invention includes a collet body 71, a first tape transport track 73, a second tape transport track 75, a first chamfered portion 77, and a second chamfered portion 79.

The collet body 71 is coupled to the tip body 30 so as not to rotate with respect to the tip body 30. In other words, the collet body 71 is provided so that the tip body 30 may be inserted.

The collet body 71 includes both side walls 72 corresponding to both sides of the tip body 30, respectively. In one example, the collet body 71 may be provided in a rectangular shape in which portions other than both sidewalls 72 are opened in the front-rear direction and the vertical direction.

The first tape transport track 73 and the second tape transport track 75 are configured to guide the conductive tape 10 transported to the tip body 30 along a predetermined path.

The first tape transport track 73 and the second tape transport track 75 are provided on front upper and rear upper parts of the collet body 71, respectively, with the welding section 41, the non-welding section 51, and the round section 61 of the tip body 30 interposed therebetween.

The first tape transport track 73 is integrally connected to front upper end parts of both sidewalls 72 in correspondence to the welding section 41. The first tape transport track 73 includes a first support surface 81 and a first track surface 82 having a round shape.

The first support surface 81 is configured to support a front surface upper part of the tip body 30. The first support surface 81 is formed to be flat.

The first track surface 82 is configured to support the conductive tape 10 traveling to the welding section 41. Furthermore, the first track surface 82 is configured to allow the conductive tape 10 to maintain predetermined tension. This first track surface 82 is formed as a round surface.

The second tape transport track 75 is integrally connected to rear upper end parts of both sidewalls 72 corresponding to the non-welding section 51. The second tape transport track 75 includes a second support surface 83 and a second track surface 84 having a round shape.

The second support surface 83 is configured to support a rear surface upper part of the tip body 30. The second support surface 83 is formed to be flat.

The second track surface 84 is configured to support the conductive tape 10 traveling to the non-welding section 51. Furthermore, the second track surface 84 is configured to allow the conductive tape 10 to maintain predetermined tension. This second track surface 84 is formed as a round surface.

Here, the first tape transport track 73 is coupled to the front surface upper part of the tip body 30. Further, the second tape transport track 75 is coupled to the rear surface upper part of the tip body 30.

To this end, the tip body 30 includes a first support step 63 formed in the front surface upper part and a second support step 65 formed in the rear surface upper part (see FIGS. 5 to 8).

The first support step 63 is engaged with the first tape transport track 73. The first support step 63 is configured to support the first support surface 81 and the bottom surface of the first tape transport track 73.

The second support step 65 is engaged with the second tape transport track 75. The second support step 65 is configured to support the second support surface 83 and the bottom surface of the second tape transport track 75.

The first chamfered portion 77 and the second chamfered portion 79 are configured to prevent the conductive tape 10 traveling along the first tape transport track 73 and the second tape transport track 75 of the collet body 71 from deviating.

In addition, the first chamfered portion 77 and the second chamfered portion 79 are configured to prevent the flange 3 of the first base material 2 and the second base material 4 from being stamped by an edge of the collet body 71 due to positional dispersion of the spot welding apparatus 1. Here, the position dispersion of the spot welding apparatus 1 may be defined as robot teaching dispersion of the spot welding apparatus 1.

Figure 12:
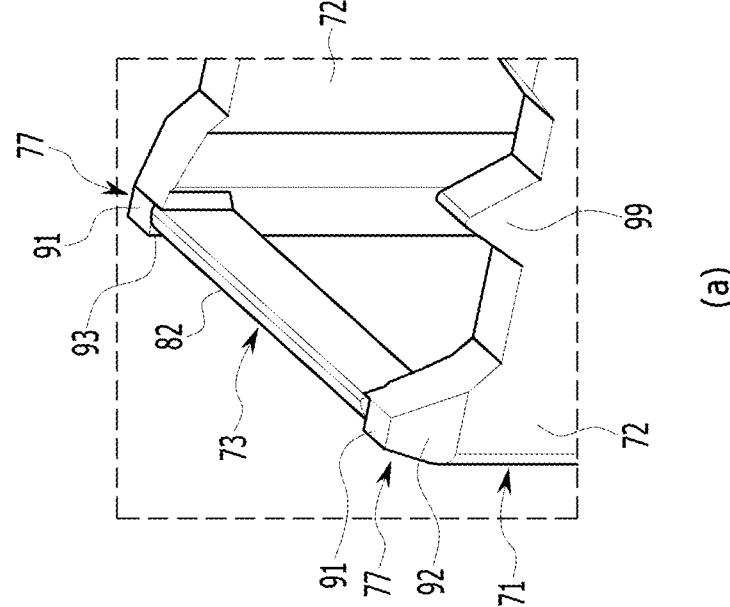
FIG. 12 is a diagram illustrating a first chamfered portion and a second chamfered portion of a collet member applied to a cap tip assembly for spot welding according to an exemplary embodiment of the present invention.

FIG. 12 is a diagram illustrating a first chamfered portion and a second chamfered portion of a collet member applied to a cap tip assembly for spot welding according to an exemplary embodiment of the present invention.

Referring to FIGS. 1 and 12, the first chamfered portion 77 is formed in a front upper end part of each of both sidewalls 72 of the collet body 71. The first chamfered portion 77 may be defined as a portion formed by chamfering the front upper end part (edge portion) of each of both sidewalls 72 of the collet body 71.

The first chamfered portion 77 is formed in the front upper end part of each of both sidewalls 72 of the collet body 71 to be lower than the uppermost end of the first tape transport track 73. The first chamfered portion 77 includes a first chamfered surface 91, a second chamfered surface 92, and a first guide surface 93.

The first chamfered surface 91 may be formed as a top surface of an edge portion of a front upper end part of each of both sidewalls 72 of the collet body 71. The first chamfered surface 91 is formed at the top of the first tape transport track 73, in other words, at a position lower than the first track surface 82.

The second chamfered surfaces 92 are configured to secure a space to avoid stamping of the flange 3 of the first base material 2 and the second base material 4 with respect to the front upper end parts of both side walls 72 of the collet body 71 due to the positional dispersion of the spot welding apparatus 1.

The second chamfered surface 92 extends obliquely from the first chamfered surface 91 to each of both sidewalls 72 of the collet body 71.

The first guide surface 93 is configured to prevent the conductive tape 10 traveling along the first tape transport track 73 from deviating.

The first guide surfaces 93 may be formed as inner surfaces (surfaces facing each other) of the first chamfered portions 77 corresponding to both ends of the first tape transport track 73. The first guide surfaces 93 are configured to support both edge ends of the conductive tape 10 transported along the first track surface 82 of the first tape transport track 73.

The second chamfered portion 79 is formed at a rear upper end part of each of both sidewalls 72 of the collet body 71. The second chamfered portion 79 may be defined as a portion in which the rear upper end (edge portion) of each of both sidewalls 72 of the collet body 71 are chamfered.

The second chamfered portion 79 is formed in the rear upper end part of each of both sidewalls 72 of the collet body 71 to be lower than the uppermost end of the second tape transport track 75. The second chamfered portion 79 includes a third chamfered surface 94, a fourth chamfered surface 95, and a second guide surface 96.

The third chamfered surface 94 may be formed as a top surface of an edge portion of a rear upper end part of each of both sidewalls 72 of the collet body 71. The third chamfered surface 94 is formed at the uppermost end of the second tape transport track 75, in other words, at a position lower than the second track surface 84.

The fourth chamfered surfaces 95 are configured to secure a space to avoid stamping of the flange 3 of the first base material 2 and the second base material 4 with respect to the rear upper end parts of both side walls 72 of the collet body 71 due to the positional dispersion of the spot welding apparatus 1.

The fourth chamfered surface 95 extend obliquely from the third chamfered surface 94 to each of both sidewalls 72 of the collet body 71.

The second guide surface 96 is configured to prevent the conductive tape 10 traveling along the second tape transport track 75 from deviating.

The second guide surfaces 96 may be formed as inner surfaces (surfaces facing each other) of the second chamfered portions 79 corresponding to both ends of the second tape transport track 75. The second guide surfaces 96 are configured to support both edge ends of the conductive tape 10 transported along the second track surface 84 of the second tape transport track 75.

Meanwhile, the collet member 70 according to an exemplary embodiment of the present invention further includes reference protrusions 99 integrally formed on the upper ends of both sidewalls 72 of the collet body 71.

The reference protrusion 99 is configured to hold a reference position of the tip body 30 with respect to the flange 3 of the first base material 2 in order to set the robot teaching of the spot welding apparatus 1.

In one example, the reference protrusion 99 is formed in a triangular rib shape on the upper end of each of both sidewalls 72 of the collet body 71.

Hereinafter, an operation of the cap tip assembly 100 for spot welding according to an exemplary embodiment of the present invention will be described in detail with reference to FIGS. 1 to 12.

First, the flange 3 of the first base material 2 is in a state superimposed on the second base material 4. In this state, the gun frame 5 of the spot welding apparatus 1 is moved toward the first base material 2 and the second base material 4 along a predetermined teaching path through a welding robot (not shown). Here, the teaching path of the welding robot may be set by the reference protrusion 99 of the collet body 71.

Here, the movable electrode 8 of the spot welding apparatus 1 is in a state of being moved in the upward direction by a driving source (not shown). In addition, the fixed electrode 6 of the spot welding apparatus 1 is positioned below the second base material 4 with the first base material 2 and the second base material 4 disposed between the movable electrode 8 and the fixed electrode 6.

Here, in the cap tip assembly 100 of each of the fixed electrode 6 and the movable electrode 8, the tip body 30 is in a state coupled to the collet member 70. The collet member 70 is in a state of being coupled to the tip body 30 with the welding section 41, the non-welding section 51, and the round section 61 of the tip body 30 disposed between the first tape transport track 73 and the second tape transport track 75.

Further, the conductive tape 10 is transported along a predetermined path and is in a state of being supported by the first tape transport track 73 and the second tape transport track 75 of the collet member 70 with a predetermined tension, and is in a state in contact with the welding section 41 of the tip body 30.

In this state, the gun frame 5 of the spot welding apparatus 1 is moved in the upward direction by the welding robot, and the movable electrode 8 is moved in the downward direction by a driving source (not shown).

Then, the fixed electrode 6 presses the bottom surface of the second base material 4, and the movable electrode 8 presses the flange 3 of the first base material 2. Here, the welding section 41 of the tip body 30 presses the top surface of the flange 3 and the bottom surface of the second base material 4 with the conductive tape 10 interposed therebetween.

In this process, by the first chamfered portion 77 and the second chamfered portion 79 of the collet member 70, it is possible to prevent the flange 3 and the second base material 4 form being stamped by the edge portion of the collet body 71.

This is because the first chamfered portion 77 and the second chamfered portion 79 are formed at the front upper end part and rear upper end part of both side walls of the collet body to be lower than the uppermost ends of the first tape conveying track 73 and the second tape conveying track 75.

Furthermore, stamping of the flange 3 and the second base material 4 by the uppermost ends of the first tape transport track 73 and the second tape transport track 75 due to the positional dispersion of the spot welding apparatus 1 does not occur due to buffering of the conductive tape 10.

Furthermore, the base metal contact surface 43 of the welding section 41 of the tip body 30 is in close contact with the flange 3 and the second base material 4 through the virtual welding start line 45 with the conductive tape 10 interposed therebetween.

Thereafter, when a welding current is applied to the tip body 30, the flange 3 of the first base material 2 and the second base material 4 are electrically conductive through the conductive tape 10.

Accordingly, the tip body 30 generates welding heat due to electrical resistance, and transfer the welding heat to the flange 3 of the first base material 2 and the second base material 4 through the base material contact surface 43 and the conductive tape 10, to melt spot welding portions of the flange 3 and the second base material 4.

Here, the melt of the flange 3 and the second base material 4 is diffused into the melt diffusion sections 47 of the base material contact surface 43 along the front-rear direction around the virtual welding start line 45. Accordingly, the base metal contact surface 43 of the welding section 41 may form a rectangular welding nugget by the melt diffusion sections 47.

Furthermore, since the tip body 30 forms the round section 61, it is possible to minimize indentation on the flange 3 and the second base material 4, and to promote the beauty of the shape of the welding nugget.

Therefore, in an exemplary embodiment of the present invention, the flange 3 of the first base material 2 and the second base material 4 may be spot-welded through a series of processes as described above.

On the other hand, during the spot welding of the flange 3 and the second base material 4 as described above, a fusion product such as spatter is generated. However, as the tip body 30 conducts the flange 3 and the second base material 4 through the conductive tape 10, the fusion product is fused to the conductive tape 10, not to the tip body 30.

On the other hand, in the state where the spot welding of the flange 3 and the second base material 4 is completed, the conductive tape 10 to which the fusion product is fused is transported through the first tape transport track 73 and the second tape transport track 75 of the collet member 70 along a predetermined path.

Here, the first guide surface 93 of the first chamfered portion 77 of the collet member 70 and the second guide surface 96 of the second chamfered portion 79 of the collet member 70 guide the conductive tape 10 being transported along the first tape transport track 73 and the second tape transport track 75. Accordingly, the conductive tape 10 does not deviate from the first tape transport track 73 and the second tape transport track 75.

The cap tip assembly 100 for spot welding according to an exemplary embodiment of the present invention as described above may spot-weld the flange 3 of the first base material 2 and the second base material 4 through the welding section 41 formed on one side of the tip body 30.

Therefore, the cap tip assembly 100 for spot welding according to an exemplary embodiment of the present invention reduces the electrode contact area with respect to the flange 3 and the second base material 4, and thus spot welding of the flange 3 with a relatively short width length and the second base material 4 is possible while maintaining the spot welding performance and cooling performance.

Accordingly, according to an exemplary embodiment of the present invention, since vehicle body parts having the flange 3 with a short width length may be spot-welded to other vehicle body parts, it is possible to reduce the weight of the vehicle body according to the assembly of the vehicle body parts.

Furthermore, the cap tip assembly 100 for spot welding according to an exemplary embodiment of the present invention may block rotation of the collet member 70 with respect to the tip body 30, and it is possible to prevent the flange 3 and the second base material 4 from being stamped by the collet member 70 due to the positional dispersion of the spot welding apparatus 1.

Figure 13:
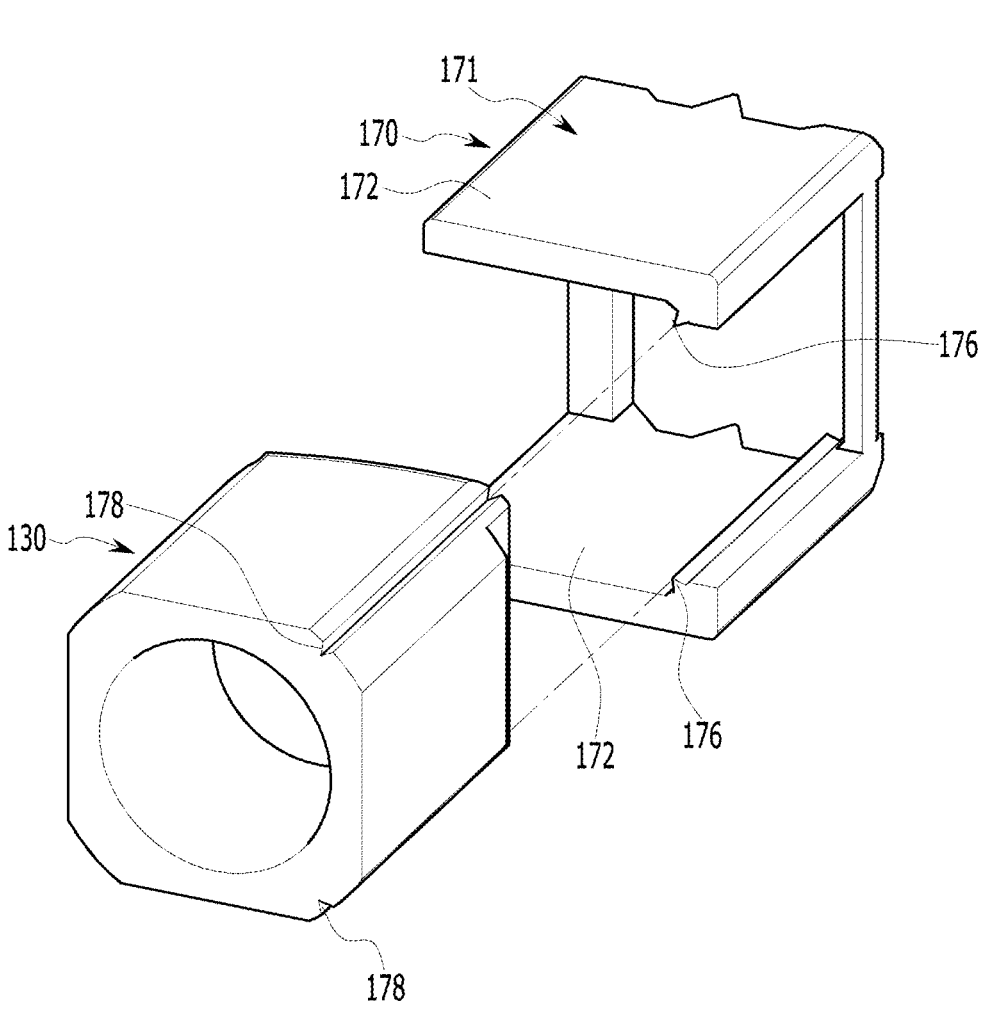
FIG. 13 is an exploded perspective view illustrating a cap tip assembly for spot welding according to another exemplary embodiment of the present invention.
Figure 14:
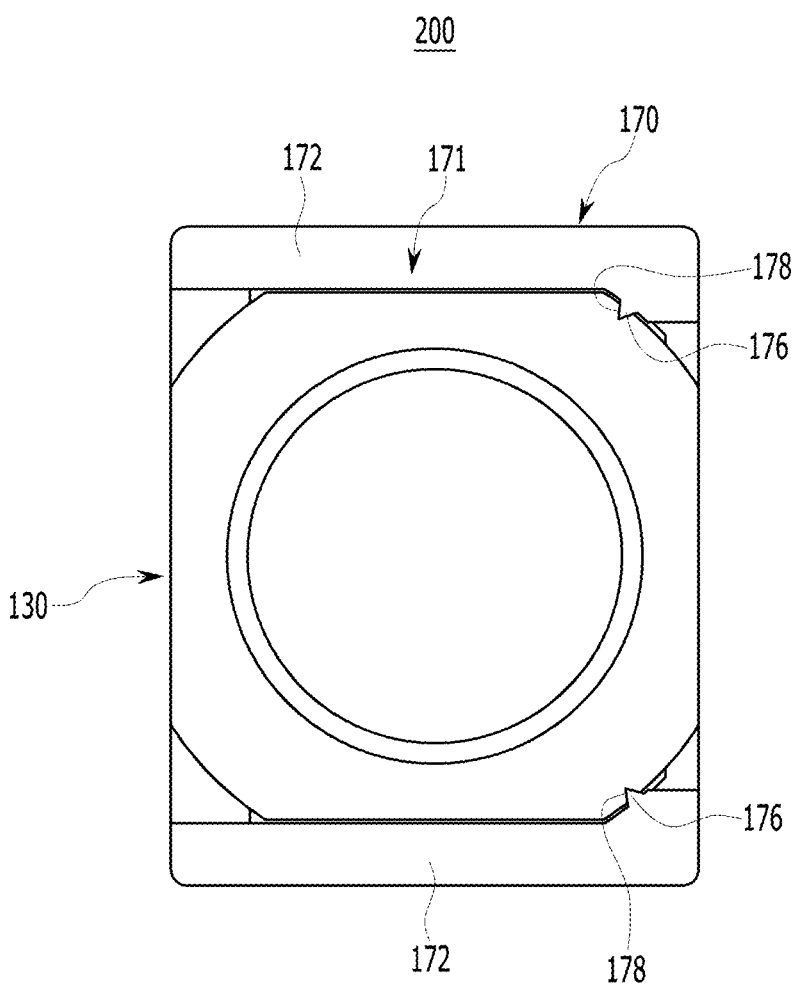
FIG. 14 is a bottom view illustrating a cap tip assembly for spot welding according to another exemplary embodiment of the present invention.

FIG. 13 is an exploded perspective view illustrating a cap tip assembly for spot welding according to another exemplary embodiment of the present invention, and FIG. 14 is a bottom view illustrating a cap tip assembly for spot welding according to another exemplary embodiment of the present invention. In the drawings, the same reference numeral is assigned to the same elements as in the above exemplary embodiments.

Referring to FIGS. 13 and 14, a cap tip assembly 200 for spot welding according to another exemplary embodiment of the present invention basically includes the constituent elements of the above exemplary embodiments.

The cap tip assembly 200 for spot welding according to another exemplary embodiment of the present invention may include a collet member 170 having a positioning protrusion 176 formed thereon, and a tip body 130 having a groove 178 formed therein.

The positioning protrusions 176 are integrally formed on both sidewalls 172 of a collet body 171 of the collet member 170. The positioning protrusion 176 is formed to protrude from an inner surface of each of both sidewalls 172. In one example, the positioning protrusion 176 protrudes in a triangular shape on an inner surface of each of the side walls 172, and the positioning protrusions 176 are disposed along the vertical direction based on the drawing.

In addition, the groove 178 is configured to engage the positioning protrusion 176. The groove 178 is provided in the form of a groove engaging the positioning protrusion 176, and the grooves 178 are formed along the vertical direction on the outer surface of the tip body 130. The groove 178 is formed in a shape corresponding to the positioning protrusion 176.

Accordingly, in the cap tip assembly 200 for spot welding according to another exemplary embodiment of the present invention, the tip body 130 may be coupled to the collet member 170 by inserting the positioning protrusion 176 into the groove 178.

Accordingly, in the cap tip assembly 200 for spot welding according to another exemplary embodiment of the present invention, it is possible to prevent erroneous assembly of the tip body 130 and the collet member 170.

The rests of features and effects of the cap tip assembly 200 for spot welding according to another exemplary embodiment of the present invention as described above are the same as in the previous exemplary embodiment, and thus a detailed description thereof will be omitted.

Although preferred exemplary embodiments of the present invention have been described above, the present invention is not limited thereto. It is possible to carry out various modifications within the scope of the claims, the detailed description of the invention, and the accompanying drawings, and they also fall within the scope of the present invention.

DESCRIPTION OF SYMBOLS

1: Spot welding apparatus
2: First base material
3: Flange
4: Second base material
5: Gun frame
6: Fixed electrode
7,9: Electrode rods
8: Movable electrode
10: Conductive tape
30, 130: Tip body
31: Coupling groove
41: Welding section
43: Base material contact surface
45: Virtual welding start line
47: Melt diffusion section
51: Non-welding section
53: Base material non-contact surface
61: Round section
63: First support step
65: Second support step
70, 170: Collet member
71, 171: Collet body
72, 172: Both side walls
73: First tape transport track
75: Second tape transport track
77: First chamfered portion
79: Second chamfered portion
81: First support surface
82: First track surface
83: Second support surface
84: Second track surface
91: First chamfered surface
92: Second chamfered surface
93: First guide surface
94: Third chamfered surface
95: Fourth chamfered surface
96: Second guide surface
99: Reference protrusion
100, 200: Cap tip assembly for spot welding
176: Positioning protrusion
178: Groove
CP: Radius center point
CV1, CV2: Curvature
R1, R2: Radius
What is claimed is:

1. A cap tip assembly for spot welding, which is mounted on at least one of electrode rods of a fixed electrode and a movable electrode of a spot welding apparatus and is configured to spot-weld a first base material in which a flange is formed and a second base material overlapping the flange in a vertical direction, the cap tip assembly for spot welding comprising a tip body provided in a shape of a rectangular block in which a round-shaped welding section is formed on a front side of a top surface, wherein the tip body comprises a non-welding section extending in a front-rear direction from the welding section to a rear side of the top surface, wherein the welding section comprises a base metal contact surface of a predetermined curvature, and a virtual welding start line formed in a direction normal to the base material contact surface, wherein the base material contact surface comprises melt diffusion sections formed on both front and rear portions based on the virtual welding start line.

2. The cap tip assembly for spot welding of claim 1, wherein the non-welding section comprises a base material non-contact surface having a greater curvature than that of the base material contact surface.

3. The cap tip assembly for spot welding of claim 2, wherein the tip body comprises round sections extending from the base material contact surface and the base material non-contact surface to both lateral sides, respectively.

4. The cap tip assembly for spot welding of claim 2, wherein a radius of the base material contact surface is greater than a radius of the base material non-contact surface.

5. A cap tip assembly for spot welding configured to spot-weld a first base material in which a flange is formed and a second base material overlapping the flange in a vertical direction, comprising:

a tip body provided in a shape of a rectangular block in which a round-shaped welding section is formed on a front side of a top surface; and a collet member coupled to the tip body to guide a conductive tape to the welding section, wherein the tip body comprises a non-welding section extending along a front-rear direction from the welding section to the rear side of the top surface, wherein the welding section comprises a base material contact surface of a predetermined curvature, and a virtual welding start line formed in a direction normal to the base material contact surface, and wherein the base material contact surface comprises melt diffusion sections formed on both front and rear portions based on the virtual welding start line.

6. The cap tip assembly for spot welding of claim 5, wherein the non-welding section has a greater curvature than the welding section.

7. The cap tip assembly for spot welding of claim 6, wherein the non-welding section comprises a base material non-contact surface having a greater curvature than that of the base material contact surface.

8. The cap tip assembly for spot welding of claim 6, wherein the collet member comprises:

a rectangular collet body including both side walls corresponding to both lateral sides of the tip body, respectively, and opened in the front-rear direction and the vertical direction;

a first tape transport track integrally connected to front upper parts of the both sidewalls to correspond to the welding section; and a second tape transport track integrally connected to rear upper parts of the both sidewalls to correspond to the non-welding section.

9. The cap tip assembly for spot welding of claim 8, wherein the collet member further comprises:

first chamfered portions formed at the front upper parts of the both sidewalls to be lower than the uppermost end of the first tape transport track; and second chamfered portions formed at the rear upper parts of the both sidewalls to be lower than the uppermost end of the second tape transport track.

10. The cap tip assembly for spot welding of claim 9, wherein the first tape transport track comprises a first support surface for supporting a front surface of the tip body, and a first track surface having a round shape for supporting the conductive tape, and the second tape transport track comprises a second support surface for supporting a rear surface of the tip body, and a second track surface having a round shape for supporting the conductive tape.

11. The cap tip assembly for spot welding of claim 10, wherein each of the first chamfered portion and the second chamfered portion comprises a guide surface supporting each of both edge ends of the conductive tape transported along the first track surface and the second track surface.

12. The cap tip assembly for spot welding of claim 9, wherein the first chamfered portion comprises:

a first chamfered surface formed at a position lower than the uppermost end of the first tape transport track; and a second chamfered surface obliquely extending from the first chamfered surface to the both sidewalls.

13. The cap tip assembly for spot welding of claim 12, wherein the second chamfered portion comprises:

a third chamfered surface formed at a position lower than the uppermost end of the second tape transport track; and a fourth chamfered surface obliquely extending from the third chamfered surface to the both sidewalls.

14. The cap tip assembly for spot welding of claim 8, wherein the tip body comprises:

a first support step formed in an upper portion of a front surface to support the first tape transport track; and a second support step formed in an upper portion of a rear surface to support the second tape transport track.

15. The cap tip assembly for spot welding of claim 8, wherein the collet body comprises positioning protrusions formed on the both sidewalls, respectively, and wherein grooves engageable with the positioning protrusions are formed in the tip body.

16. The cap tip assembly for spot welding of claim 8, wherein the collet member comprises triangular rib-shaped reference protrusions integrally formed on upper ends of both sidewalls of the collet body.

* * * * *